US009772052B2

(12) United States Patent
Garver et al.

(10) Patent No.: US 9,772,052 B2
(45) Date of Patent: *Sep. 26, 2017

(54) MULTI-LAYERED FUEL TUBING

(71) Applicant: SAINT-GOBAIN PERFORMANCE PLASTICS CORPORATION, Aurora, OH (US)

(72) Inventors: Wayne Edward Garver, Hudson, OH (US); Mark Fisher Colton, Rootstown, OH (US)

(73) Assignee: Saint-Gobain Performance Plastics Corporation, Solon, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/689,214

(22) Filed: Apr. 17, 2015

(65) Prior Publication Data
US 2015/0219251 A1 Aug. 6, 2015

Related U.S. Application Data

(63) Continuation of application No. 14/222,777, filed on Mar. 24, 2014, now Pat. No. 9,221,206, which is a continuation of application No. 13/346,441, filed on Jan. 9, 2012, now Pat. No. 8,679,609, which is a continuation of application No. 12/433,110, filed on Apr. 30, 2009, now Pat. No. 8,092,881.

(60) Provisional application No. 61/049,642, filed on May 1, 2008.

(51) Int. Cl.
| | | |
|---|---|---|
| *F16L 11/04* | (2006.01) | |
| *B32B 1/08* | (2006.01) | |
| *B29C 47/00* | (2006.01) | |
| *F16L 11/00* | (2006.01) | |
| *B32B 27/08* | (2006.01) | |
| *B32B 27/30* | (2006.01) | |
| *B32B 27/40* | (2006.01) | |
| *F16L 11/08* | (2006.01) | |
| *B29D 23/00* | (2006.01) | |
| *B32B 27/22* | (2006.01) | |
| *F16L 11/12* | (2006.01) | |
| *B32B 27/18* | (2006.01) | |
| *F16L 9/14* | (2006.01) | |
| *F16L 9/147* | (2006.01) | |
| *B29C 47/06* | (2006.01) | |
| *B29C 47/26* | (2006.01) | |

(52) U.S. Cl.
CPC .......... *F16L 11/04* (2013.01); *B29C 47/0009* (2013.01); *B29C 47/266* (2013.01); *B29C 47/268* (2013.01); *B29D 23/00* (2013.01); *B32B 1/08* (2013.01); *B32B 27/08* (2013.01); *B32B 27/22* (2013.01); *B32B 27/304* (2013.01); *B32B 27/40* (2013.01); *F16L 11/00* (2013.01); *F16L 11/08* (2013.01); *F16L 11/12* (2013.01); *B29C 47/0023* (2013.01); *B29C 47/067* (2013.01); *B29C 47/26* (2013.01); *B32B 27/18* (2013.01); *B32B 2250/03* (2013.01); *B32B 2250/04* (2013.01); *B32B 2250/24* (2013.01); *B32B 2270/00* (2013.01); *B32B 2274/00* (2013.01); *B32B 2307/306* (2013.01); *B32B 2307/402* (2013.01); *B32B 2307/54* (2013.01); *B32B 2307/714* (2013.01); *B32B 2307/7242* (2013.01); *B32B 2307/7265* (2013.01); *B32B 2597/00* (2013.01); *B32B 2605/08* (2013.01); *F16L 9/14* (2013.01); *F16L 9/147* (2013.01); *Y10T 428/1352* (2015.01); *Y10T 428/1379* (2015.01); *Y10T 428/1383* (2015.01); *Y10T 428/1393* (2015.01)

(58) Field of Classification Search
CPC .......... B32B 1/08; B32B 27/18; B32B 27/22; B32B 27/304; B32B 27/40; F16L 9/14; F16L 9/147; F16L 11/00; F16L 11/04
See application file for complete search history.

(56) References Cited

U.S. PATENT DOCUMENTS

| | | | |
|---|---|---|---|
| 3,528,457 A | 9/1970 | Martin et al. | |
| 4,640,313 A | 2/1987 | Stanley | |
| 4,997,955 A | 3/1991 | Merger et al. | |
| 5,349,989 A | 9/1994 | Legallais | |
| 6,140,417 A | 10/2000 | Nakanishi et al. | |
| 6,807,988 B2 | 10/2004 | Powell et al. | |
| 8,092,881 B2 | 1/2012 | Garver et al. | |
| 8,679,609 B2 * | 3/2014 | Garver et al. | 428/36.91 |
| 9,528,637 B2 * | 12/2016 | Garver | B32B 1/08 |
| 2004/0069361 A1 | 4/2004 | Cheng et al. | |

(Continued)

FOREIGN PATENT DOCUMENTS

| | | |
|---|---|---|
| CA | 2 303 472 | 9/2001 |
| DE | 16 50 138 A1 | 9/1970 |

(Continued)

OTHER PUBLICATIONS

International Search Report, PCT/US2009/042500, 2 pages.

(Continued)

*Primary Examiner* — Walter B Aughenbaugh
(74) *Attorney, Agent, or Firm* — McDonnell Boehnen Hulbert & Berghoff LLP

(57) ABSTRACT

The invention describes a flexible tubular article for transport of volatile hydrocarbons comprising: (a) an inner layer of a polyvinylidene difluoride (PVDF) polymer or a polyvinylidene difluoride copolymer; (b) an intermediate thermoplastic polyurethane (TPU) layer extruded in tubular form over the inner PVDF layer, and (c) a polyvinyl chloride polymer extruded in tubular form over the outside surface of the intermediate layer and being coextensive therewith. The tubular articles of the invention have a maximum permeation rating of 15 g/m²/day under SAE J1737 test conditions.

20 Claims, 1 Drawing Sheet

(56) References Cited

U.S. PATENT DOCUMENTS

2005/0113234 A1   5/2005  Eagles et al.
2007/0125438 A1   6/2007  Hardy et al.
2008/0003389 A1   1/2008  Hoffmann et al.

FOREIGN PATENT DOCUMENTS

| EP | 0 003 449 A1 | 8/1979 |
|----|--------------|--------|
| EP | 0 558 373 A2 | 9/1993 |
| EP | 1 537 989 A1 | 6/2005 |
| EP | 1 754 919 A1 | 2/2007 |
| FR | 2 436 676 A1 | 4/1980 |
| JP | 62-253428 | 11/1987 |
| JP | 6-281056 | 10/1994 |
| JP | 8-142151 | 6/1996 |
| JP | 8-336942 | 12/1996 |
| JP | 10-61833 | 3/1998 |
| JP | 30-59736 | 7/2000 |
| JP | 2001-074174 | 3/2001 |
| JP | 2001-108163 | 4/2001 |
| JP | 2001-248764 | 9/2001 |
| JP | 2003-527250 | 9/2003 |
| WO | WO 97/04264 | 2/1997 |
| WO | WO 01/06163 | 1/2001 |
| WO | WO 2007/122335 | 11/2007 |
| WO | WO 2008/005744 A2 | 1/2008 |

OTHER PUBLICATIONS

The Engineering Society for Advancing Mobility Land Sea Air and Space International, "Surface Vehicle Recommended Practice", Aug. 1997, 22 pages.

\* cited by examiner

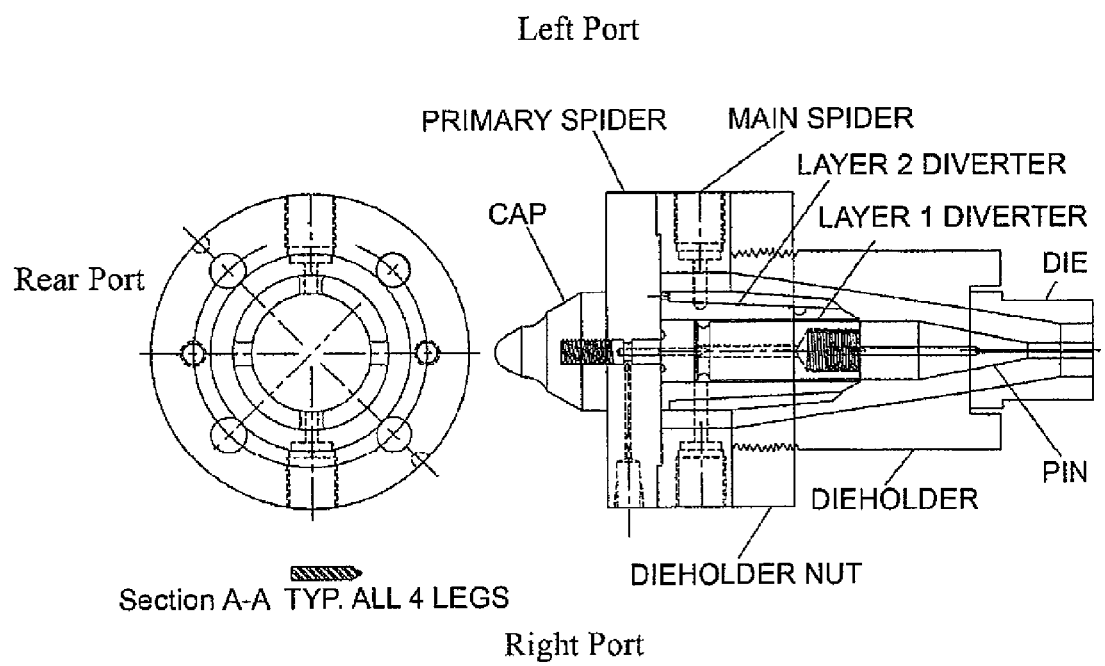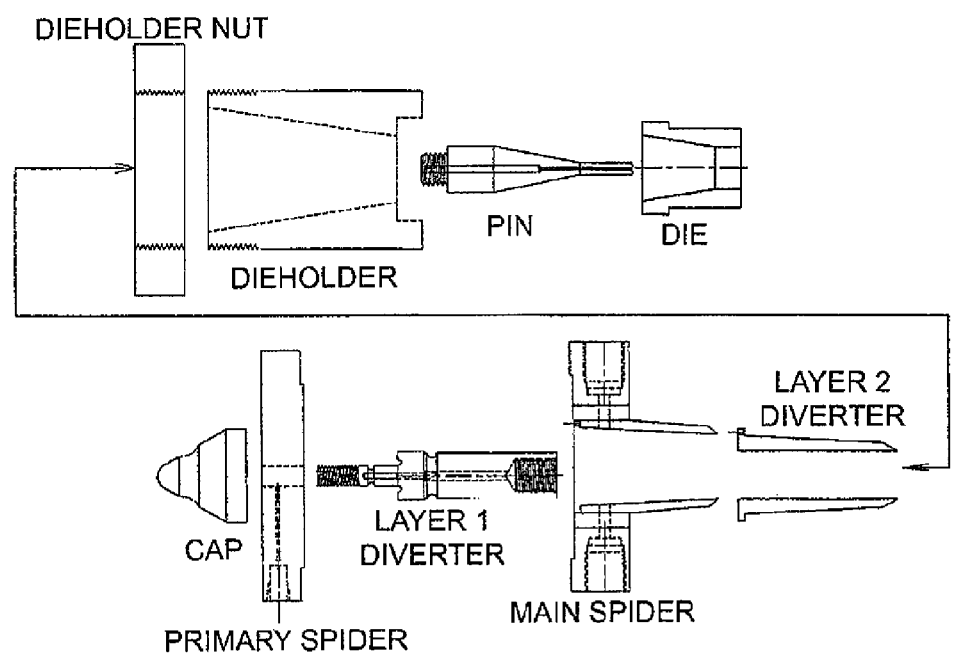

MULTI-LAYERED FUEL TUBING

CROSS REFERENCE TO RELATED APPLICATIONS

This application is a continuation of U.S. application Ser. No. 14/222,777, filed Mar. 24, 2014, issued as U.S. Pat. No. 9,221,206 on Dec. 29, 2015, which is a continuation of U.S. application Ser. No. 13/346,441, filed Jan. 9, 2012 issued as U.S. Pat. No. 8,679,609 on Mar. 25, 2014, which is a continuation of U.S. application Ser. No. 12/433,110, filed Apr. 30, 2009, issued as U.S. Pat. No. 8,092,881 on Jan. 10, 2012, which claims benefit under 35 U.S.C. §119(e) to U.S. Ser. No. 61/049,642, filed May 1, 2008, the contents of both of which are incorporated herein by reference in their entirety.

FIELD OF THE INVENTION

The invention relates generally to multilayer tubing, their methods for the manufacture and use as compliant fuel tubings that meets the requirements of the California Air Resources Board for low permeation of fuel.

BACKGROUND OF THE INVENTION

Multilayered or laminated rubber tubing serving as a fuel transporting hose for an automotive fuel feed line into a vehicle reservoir are available. The conduit wall may have three or more layers; a heat and gasoline-resistant inner tube; a gasoline impermeable barrier layer, an intermediate elastomeric tie layer; a weather-resistant outer tube and a reinforcing fiber matrix or layer interposed and integrated between the outer and intermediate tie layers. Even so, oxygenated fuel adversely affect a fuel hose life so that enhanced gasoline-resistant features are needed.

The US EPA is in the process of establishing new, more restrictive requirements on non-automotive fuel systems that will limit the release of hydrocarbons into the environment. The State of California, through the California Air Resources Board (CARB), has taken this permeation requirement a step further by requiring a maximum permeation rate of 15 $g/m^2/day$, but the test involves a 1,000 hour pre-test soak step. In addition, the test is performed on circulating fuel, measuring the capture of hydrocarbons permeating through the tube wall and the test temperature is elevated to 40° C. The marketplace does not want to be in a position of having to use one tube/hose for California and another for the rest of the US, so it is critical that a small engine, non-automotive fuel line meets the most rigorous requirement of CARB.

It is difficult to pass the CARB requirement with tube/hose made of thermoplastic materials. Most tubes/hoses that would meet such stringent requirements are made of thermoset materials. Thermoset tubes do not lend themselves easily to flexibility, sizing, continuous length, customization and are opaque.

Therefore, a need remains for tubing that would meet the CARB requirements and fulfills one or more of the current disadvantages of current products.

BRIEF SUMMARY OF THE INVENTION

The present invention surprisingly provides a thermoplastic multi-layer flexible tubular article for transport of volatile hydrocarbons comprising: (a) an inner layer of a polyvinylidene difluoride (PVDF) polymer or a polyvinylidene difluoride copolymer; (b) an intermediate thermoplastic polyurethane (TPU) layer extruded in tubular form over the inner PVDF layer, and (c) a polyvinyl chloride polymer extruded in tubular form over the outside surface of the intermediate layer and being coextensive therewith.

A fourth layer, or additional layers, can be included about the outermost thermoplastic layer if so desired.

The layers can be coextruded such that binders or tie layers are not required. The TPU is contacted with the PVDF or PVDF copolymer and results in a direct bond during the extrusion process. This is advantageous as the necessity of a binder or tie layer is eliminated thus reducing in overall cost. The result is a more durable bond/adhesion between layers. Another advantage of utilizing all thermoplastic materials is the ability to view the fuel/fluid moving through the tubing.

The constructs disclosed herein provide maximum permeation ratings of 15 $g/m^2/day$, more particularly 7 $g/m^2/day$ and even more particularly 5 $g/m^2/day$ under SAE J1737 test conditions.

Generally, the tubing constructs have an inner diameter (ID) of from about 1.7 mm and about 25.4 mm, more particularly from about 2.4 mm to about 9.5 mm and even more particularly from about 6.1 mm to about 6.5 mm.

Use of coextrusion also provides the ability to produce tubing on a continuous basis, so that varying lengths of tubing can be prepared, unlike thermoset tubing which is limited in this respect. Use of thermoplastic materials as the outermost layer also provides the ability to customize the jacket with logos, colors, etc. It is possible to add a colorant to the thermoplastic so that the outer layer has a uniform coloration imparted to the tubing.

The layers used to prepare the multi-layer tubing of the invention are all melt processable, thus providing an advantage over that of the current art in that typical multistep fabrication is not required (to produce the multi-layer tubing). Co-extrusion of each layer thus provides that solvent based adhesives typically required to adhere each layer to each other are not required with the present invention.

It should be understood that the multi-layer tubing of the invention can include from 2 layers to about 12 layers of material. For example, the multi-layer tubing can repeat layering of a first layer and a second layer, and so forth. This layering, again, can be repeated as needed for the application envisioned.

The present invention also provides methods to prepare the multi-layer tubing noted throughout the specification.

While multiple embodiments are disclosed, still other embodiments of the present invention will become apparent to those skilled in the art from the following detailed description. As will be apparent, the invention is capable of modifications in various obvious aspects, all without departing from the spirit and scope of the present invention. Accordingly, the detailed descriptions are to be regarded as illustrative in nature and not restrictive.

BRIEF DESCRIPTION OF THE FIGURES

FIG. 1 provides a suitable extrusion head design to produce a 3 layer multi-layered tubing of the invention.

DETAILED DESCRIPTION

The present invention provides novel multi-layer tubing and methods to prepare the multi-layer tubing by using melt processable materials and coextruding the materials to prepare the multi-layer tubing. In general the multi-layer tubing of the invention include a thermoplastic multi-layer flexible tubular article for transport of volatile hydrocarbons comprising: (a) an inner layer of a polyvinylidene difluoride (PVDF) polymer or a polyvinylidene difluoride copolymer; (b) an intermediate thermoplastic polyurethane (TPU) layer extruded in tubular form over the inner PVDF layer, and (c) a polyvinyl chloride polymer extruded in tubular form over the outside surface of the intermediate layer and being coextensive therewith.

Thermoplastic polyurethanes (TPUs) are known in the art. Typically, a thermoplastic polyurethane is formed by reacting a polyol with an isocyanate. The overall properties of the polyurethane will depend upon the type of polyol and isocyanate, crystallinity in the polyurethane, the molecular weight of the polyurethane and chemical structure of the polyurethane backbone.

Polyurethanes may be either thermoplastic or thermoset, depending on the degree of crosslinking present. Thermoplastic urethanes (TPUs) do not have primary crosslinking while thermoset polyurethanes have a varying degree of crosslinking, depending on the functionality of the reactants.

Thermoplastic polyurethanes are commonly based on either methylene diisocyanate (MDI) or toluene diisocyanate (TDI) and include both polyester and polyether grades of polyols. Thermoplastic polyurethanes can be formed by a "one-shot" reaction between isocyanate and polyol or by a "pre-polymer" system, wherein a curative is added to the partially reacted polyolisocyanate complex to complete the polyurethane reaction. Examples of some common thermoplastic polyurethane elastomers based on "pre-polymers" are "TEXIN", a tradename of Bayer Materials Science, "ESTANE", a tradename of Lubrizol, "PELLETHANE", a tradename of Dow Chemical Co., and "ELASTOLLAN", a tradename of BASF, Inc.

Typically the TPUs used in the invention are the ester type. Ester-type polyurethanes (PUs) can be based on different compositions of substituted or unsubstituted methane diisocyanate (MDI) and a substituted or unsubstituted dihydroxy alcohol (a glycol). Suitable TPUs are those that have a Shore A Hardness of between about 70 to about 90 on the Shore A hardness scale. Tensile strength of the TPU should be between about 4000 and about 7000 psi.

Extrusion grades of TPU which have low melt indexes (MI) and high melt strength are generally used. Suitable melt index ranges are from about 1 to about 5 g/10 minute at 190° C. with an 8.7 kg load.

In one embodiment, the inner and outer TPU layers are composed of ESTANE 58070 and/or DESMOPAN 385E (Bayer Material Science).

PVDF is a highly non-reactive and pure thermoplastic fluoropolymer. Commercially available vinylidene difluoride-containing fluoropolymers include, for example, those fluoropolymers having the trade designations; "KYNAR" (e.g., "KYNAR 740", "KYNARFLEX 2500" AND "KYNARFLEX 2750") as marketed by Arkema.; "HYLAR" (e.g., "HYLAR 700") as marketed by Solvay Solexis, Morristown, N.J.; and "FLUOREL" (e.g., "FLUOREL FC-2178") as marketed by Dyneon, LLC. Suitable hardness values for the material are from about 55 to about 70 Shore D. Melting points of the material fall within the range of between about 250 and about 330° F.

Generally, the material should have a flexural modulus below about 120,000.

PVDF is a specialty plastic material in the fluoropolymer family; it is used generally in applications requiring the highest purity, strength, and resistance to solvents, acids, bases and heat and low smoke generation during a fire event. Compared to other fluoropolymers, it has an easier melt process because of its relatively low melting point.

PVDF copolymers include, but are not limited to, the copolymers of vinylidene difluoride (VDF) and trifluoroethylene (TrFE)P(VDF-TrFE), usually in ratios of about 50:50 wt % and 65:35 wt % (equivalent to about 56:44 mol % and 70:30 mol %) and vinylidene difluoride and tetrafluoroethylene (TFE) P(VDF-TFE) and vinylidene difluoride and hexafluoropropylene (HFP) P(VDF-HFP).

Generally the first inner layer has a thickness of between about 0.005 and about 0.0202 inches.

The second interior layer has a thickness of between about 0.001 and about 0.005 inches.

The third outer layer has a thickness of between about 0.020 inches and about 0.125 inches.

Additional layers can be included and can include one or more of any of the first, second, third or fourth layers noted above.

Suitable PVC materials include those thermoplastic polymers that are prepared from polymerization of vinyl chloride. Suitable PVC materials useful in the present invention include those that have a 65-90 Shore A and or a tensile strength of between about 1200 and about 3000 psi.

Typically, the PVC material includes a plasticizer and/or a stabilizer. Suitable plasticizers include, for example, those prepared from a polyglycol and a dicarboxylic acid, such as adipic acid (a polyoldiester). Suitable examples of plasticizers include, for example, PARAPLEX G-57, RX-13317, and PARAPLEX G-59 (Hallstar, Chicago, Ill.). Suitable viscosity ranges of the plasticizer are from about 7,000 to about 25,000 and a molecular weight range from about 3,500 to about 7,000. Generally the plasticizer is between about 30 to about 50% of the composition by weight.

Suitable stabilizers include, for example, organo tin and Ba—Zn composite type stabilizers. Suitable examples of the organo tin type stabilizers include MARK 275, MARK 1900 (Chemtura Corporation) and THERMOLITE 31 (Arkema). Generally, between about 0.5 and about 1.0% by weight of organo tin type stabilizer is included in the polymer blend.

Suitable examples of Ba—Zn type stabilizers include Mark 4716 and Mark 4718 (Chemtura Corporation). Generally, between about 1 and about 2.5% by weight of Ba—Zn stabilizer is included in the polymer blend.

In the specification and in the claims, the terms "including" and "comprising" are open-ended terms and should be interpreted to mean "including, but not limited to . . . ." These terms encompass the more restrictive terms "consisting essentially of" and "consisting of".

It must be noted that as used herein and in the appended claims, the singular forms "a", "an", and "the" include plural reference unless the context clearly dictates otherwise. As well, the terms "a" (or "an"), "one or more" and "at least one" can be used interchangeably herein. It is also to be noted that the terms "comprising", "including", "characterized by" and "having" can be used interchangeably.

Unless defined otherwise, all technical and scientific terms used herein have the same meanings as commonly understood by one of ordinary skill in the art to which this invention belongs. All publications and patents specifically mentioned herein are incorporated by reference in their entirety for all purposes including describing and disclosing the chemicals, instruments, statistical analyses and methodologies which are reported in the publications which might be used in connection with the invention. All references cited in this specification are to be taken as indicative of the level of skill in the art. Nothing herein is to be construed as an admission that the invention is not entitled to antedate such disclosure by virtue of prior invention.

The methods of the invention to prepare the multi-layer tubing herein provide a couple of surprising advantages over known multi-layer tubing. First, since co-extrusion of the melt processable materials is utilized, the process itself eliminates multiprocessing steps often required to prepare multi-layer tubing. Second, most (if not all) multi-layer tubing require a solvent based adhesive, such as a polyurethane, to effect adhesion between layers. Adhesives are not required with the present invention.

As a consequence of the choice of materials for the multi-layer tubing, as well as the process to prepare the multi-layer tubing, the cost of the multi-layer tubing is decreased relative to known processes and materials.

The present inventive multi-layer tubing does not require coupling agents that are coated onto, for example the TPU layer to adhere the interior PVDF or PVDF copolymer layer and likewise, no coupling layer is required to adhere the interior layer to the outer layer. The present invention avoids the use of additional coupling or adhesive layers generally required to adhere each multi-layer tubing layer to each other.

The adhesion between the inner layer and intermediate layers of the invention (e.g., PVDF or PVDF copolymer and TPU) is very strong as measured by linear peel strength of between about 5 and about 25 pounds average peel force as measured by ASTM D413.

Methods to prepare the multi-layer tubing are known in the art. Coextrusion is a particularly advantageous process for the preparation of multi-layer tubing of the invention. In coextrusion, the layers of the composite are brought together in a coextrusion block as melt layers and then extruded together through an annular slot type die. In order to produce tubing, a slot die, for example, is used during extrusion.

Typically, the setup for making the multi-layered tube begins by bringing the required number and size extruders together. The number of materials used determines the number of extruders needed. The extruders are sized according to the layer thickness with which they are associated. In the present application, a 1 inch to a 1.5 inch extruder is utilized for the PVDF, or PVDF copolymer, while a 1 inch to 1.5 inch extruder is used for the TPU layer and 2 inch to a 3.5 inch extruder is used for the PVC layer. A larger extruder, typically a 2.5" to 3.5" extruder is used for a possible fourth (outer) layer.

An extrusion head is employed that will be fed material from the different extruders and convert those material flow streams into concentric layers of the designed thickness and position. The various extruders are clamped or otherwise fixed to the inlet flanges of the extrusion head.

As a part of the extrusion head assembly, a die of a specific size is inserted and secured at the discharge end of the extrusion head which helps determine the ultimate outside diameter of the final tube. A pin or nose is also inserted and secured at the discharge end of the extrusion head which helps determine the inside diameter of the tube.

The extrusion head is heated. This can be accomplished, for example, by using a series of band and cartridge-shaped electric resistance heaters, which are individually controlled through a control panel. The individual extruders are heated in a similar way. The extruder temperatures are dictated by the material which they convey, adjusted to obtain a smooth, free-flowing melt stream of polymer as the material exits the end of the extruder and enters the extrusion head. The screw speed/rpm of each extruder can be adjusted to deliver the desired layer thickness of the respective polymer in the tubing product. The temperature of the barrier layer extruder can range from about 350 to about 380° F. The temperature of the polyurethane extruder can range from about 360 to about 400° F. The temperature of the extruder for the outer layer can range from about 310 to 340° F. The temperature of the extrusion head itself can range from 320 to 360° F.

At start-up, the different extruders are started in sequence beginning with the barrier material, immediately followed by the polyurethane material, which is immediately followed by the outer layer material. The flows of the different materials should be initiated in a nearly simultaneous manner to allow the different layers to form within the head without blocking off any one material stream. The combined, layered materials are allowed to flow from the die and fall to the floor until a smooth, continuous melt stream forms.

Once the different melt flows are established, the operator can cut and grab the melt stream and string the tubing down the line, through a water bath and a puller. Once the tubing exits the die, it is directed into a water cooling bath, typically at atmospheric pressure. The tubing is guided through this bath using rollers that clamp to the water bath walls. The water in the bath is maintained at a constant level, which cools the tubing. The tubing exits the water tank and passes through a puller. The puller is essentially comprised of two rotating caterpillar belts rotating opposite to each other. The belts are driven by a motor and can be raised or lowered to adjust the gap between the belts. The purpose of the puller is to pull the tubing through from the die at a constant speed and a constant tension. This constant tension is utilized to help maintain the size of the tubing.

After the cooled tubing has passed through the puller, the operator will cut and examine the tubing to determine whether the different layers are properly formed and are of the desired thickness. The operator will make adjustments to the appropriate extruder speed/rpm to increase of decrease the layer thickness until it is within specification. Once the tubing is properly sized, the operator will string the tubing through the remainder of the downstream equipment to the cutter.

Once the tubing has passed through the puller, it can pass through a branding station. An ink brand can be transferred to the surface of the tubing, either by use of an engraved wheel or and ink jet spray. The legend and color of the brand is determined by the customer.

After branding, the tubing is passed through an on-line cutter which is programmed to cut the tubing into specific lengths. The cutter employs a set of feed rolls which help to pull and guide the tubing into the cutting chamber. Once the tubing is cut, it falls into a collection box. From the collection box, the operator withdraws the tubing and packages the tubing according to the length and number of parts required per package. For example a coil of tubing 50 feet in length could be a common package.

In one exemplary method, the multi-layered fuel tubing product is made using an extrusion head that forms a tube that consists of three (3) discrete layers bonded into a single structure that has a circular cross-section and a single inner lumen. This type of head can be referred to as an ABC design, because the first, second and third layers are made of different materials. The range of layer thicknesses are described herein. This head can be generally thought of as an in-line tubing head that has been adapted to a produce a 3-layer product that accommodates two side extruders. It should be understood that the head can be modified by one of ordinary skill in the art.

In the case of a 3-layer product, there can be more than one way to design the head which would occur to a person having ordinary skill in the art. There would be no manifold or choke valves needed, since that stream would not be split into two. Only three flow plates would be employed. Such a head would only be capable of producing a 3-layer product.

For example, the multi-layered fuel tubing product is made using a custom-design extrusion head that forms a tube that consists of three (3) discrete layers bonded into a single structure that has a circular cross-section and a single inner lumen. This type of head can typically be used to make tubing that can be referred to as an ABA design or an ABC design. In the ABA design configuration, the first and third layers are made of the same material—three layers/two materials. In the ABC design configuration, all the layers are made of different material—three layers/three materials. The range of layer thicknesses is described in the document. This head can be generally thought of as an in-line tubing head that has been adapted to a produce a 3-layer product that accommodates two side extruders.

Reference to FIG. 1, provides the basis for discussion of the head/tooling design. The left and right designations assume that the reader is viewing line from the packaging end, looking back towards the head.

The 3-layer head is designed to create the third (outer) layer from the rear-mounted extruder. This material flows in from behind the cap. This is designated for the largest extruder and therefore is associated with the thickest layer. The extruder size that mates to the rear flange is typically a 2.5" to 3.5" extruder. This outer layer can be a material based on a PVC formulation.

The left port is designed to accept the extruder that pumps the material for layer 1. This is the liner layer and can be comprised of a polyvinylidene fluoride (PVDF). The liner material is typically a minor component on a weight-per-foot basis and the extruder size that mates to the left port is typically a 1" to 1.5" extruder.

The right port is designed to accept the extruder that pumps the material for layer 2. The second layer is typically a minor component on a weight-per-foot basis and extruder size that mates to the right port is typically a 1.25" to 1.5" extruder. This second layer can be a material based on a polyurethane formulation.

The two flow diverters are designed to convert the linear plug flow of material from the various extruders into a flow with a circular cross-section. The diverters are designed to promote a balanced flow of each layer, resulting in even, consistent individual layers in the final product. As the individual flow layers exit the diverters, the materials meet each other in the area inside the die holder and are forced between the pin and die and subsequently exit the head.

Other design details in the head are concerned with the relative thickness of the individual layers. These considerations dictate the gap between the various layer diverters. Within certain limits the layer thickness can be controlled by the screw speeds of the different extruders. If the layer thicknesses need to be altered substantially it may be necessary to fabricate new diverters that are designed with gaps that provide the desired layer distribution in the final product.

In any of the multi-layer cases, the possibility exists for a process design that allows for the production of more than one layer from a first, or core, machine. Then, additional layers can be applied downstream by passing this core or sub-assembly tube through a cross-head extruder and applying added layers as a second step.

This sequential type of layering creates a multi-layered product, but it does have some disadvantages. Typically, the bond between the outermost layer of the core tube and the innermost layer applied by the cross-head is not as robust as might be achieved by the simultaneous joining of layers in a true multi-layer head. The floor space required by two separate extrusion stations is greater than that required by use of an all-in-one head approach. A sequential approach invites additional sources of variation, since the cross head must accommodate normal variations in the core tube. For example, the core tube can swell slightly upon exiting the die, which can create a core tube outer diameter (OD) that is greater than the cross-head inlet can allow. If the OD is large enough, the core tube could become lodged at the cross-head inlet, resulting in the backing up of the line. This would result in line stoppage, correction of the problem and a re-stringing of the tubing. Another source of variation can occur if the core tube is stretched or pulled too much, resulting in a small core tube OD. If this occurs, the core tube will have too much 'play' as it passes through the cross-head, resulting in layer imbalance. In the single head approach, all of the layer control is maintained in the design and operation of the single head, which tends to yield a superior product versus the sequential approach.

The present process is solvent-free and therefore advantageous from an economic and ecological standpoint. The process according to the invention permits the continuous preparation of endless plastics composites.

The multi-layered fuel tubing/hose of the invention can be used to transfer gasoline fuels in non-automotive engines. The present invention provides a low-permeation design which meets the permeation performance requirements of US EPA and the State of California which requires particularly stringent permeation performance. Non-automotive engines can include equipment such as motorcycles, 4-wheel and other recreational vehicles, lawn tractors, string trimmers, chain saws and other lawn care equipment.

The construction of the multi-layered tube, where the inner layer that is in contact with the fuel provides the advantages that PVDF comes directly into contact with the fuel. PVDF has extremely low extractables, if any, and therefore does not cause fouling of fuel line systems.

The multi-layered tubings of the invention also have the advantage of desirable bend radii. For example, the smaller the bend radius, the better for applications where the tubing is required to bend at sharp angles.

The following paragraphs enumerated consecutively from 1 through 10 provide for various aspects of the present invention. In one embodiment, in a first paragraph (1), the present invention provides a flexible tubular article for transport of volatile hydrocarbons comprising: (a) an inner layer of a polyvinylidene difluoride (PVDF) polymer or a polyvinylidene difluoride copolymer; (b) an intermediate thermoplastic polyurethane (TPU) layer extruded in tubular form over the inner PVDF layer, and (c) a polyvinyl chloride polymer extruded in tubular form over the outside surface of the intermediate layer and being coextensive therewith.

2. The article according to paragraph 1 wherein the TPU is a polyester polyurethane.

3. The article according to either of paragraphs 1 or 2, wherein the polyvinyl chloride further comprises a stabilizer or a plasticizer.

4. The article according to paragraph 3, wherein the stabilizer is a organo tin or Ba—Zn compositions.

5. The article according to paragraph 3, wherein the plasticizer is a polyol diester.

6. The article according to any of paragraphs 1 through 5, wherein the article has a maximum permeation rating of 15 $g/m^2/day$.

7. The article according to any of paragraphs 1 through 5, where in the article has a maximum permeation rating of 7 $g/m^2/day$.

8. The article according to any of paragraphs 1 through 5, wherein the article has a maximum permeation rating of 5 g/m²/day.

9. A method to coextrude a multi-layer flexible tubular article for transport of volatile hydrocarbons comprising the step of coextruding (a) an inner layer of a polyvinylidene difluoride (PVDF) polymer or a polyvinylidene difluoride copolymer; (b) an intermediate thermoplastic polyurethane (TPU) layer in tubular form over the inner PVDF layer, and (c) a polyvinyl chloride polymer in tubular form over the outside surface of the intermediate layer and being coextensive therewith.

10. The method of paragraph 9, further comprising any of the materials noted in paragraphs 3 through 5.

The invention will be further described with reference to the following non-limiting Examples. It will be apparent to those skilled in the art that many changes can be made in the embodiments described without departing from the scope of the present invention. Thus the scope of the present invention should not be limited to the embodiments described in this application, but only by embodiments described by the language of the claims and the equivalents of those embodiments. Unless otherwise indicated, all percentages are by weight.

EXAMPLES

Example 1

The following tables describe the process conditions used to produce the various tubing prototypes specified in the examples. The convention for naming the various layers starts from the innermost layer (Layer 1) and increments outward towards the outermost layer.

| Exp. Tubing C-648-CE-D11 | | | |
|---|---|---|---|
| | Layer 1 | Layer 2 | Layer 3 |
| Material | KynarFlex 2500-00 | Estane 58213 | C-527-D11 |
| Extruder Size | 1.25" | 1.25" | 2.5" |
| Temp. Range (° F.) | 490-510 | 370-400 | 310-330 |
| Screw RPM | 4-9 | 2-4 | 20-32 |

| Exp. Tubing C-677-CE-D11 | | | |
|---|---|---|---|
| | Layer 1 | Layer 2 | Layer 3 |
| Material | KynarFlex 2500-00 | Elastollan C85A10 | C-527-D11 |
| Extruder Size | 1.25" | 1.25" | 2.5" |
| Temp. Range (° F.) | 490-510 | 420-440 | 310-330 |
| Screw RPM | 4-9 | 2-4 | 20-32 |

| Exp. Tubing 339-287-1 | | | |
|---|---|---|---|
| | Layer 1 | Layer 2 | Layer 3 |
| Material | KynarFlex 2500-00 | Estane 58277 | C-527-D11 |
| Extruder Size | 1.25" | 1.25" | 2.5" |
| Temp. Range (° F.) | 490-510 | 370-400 | 310-330 |
| Screw RPM | 4-9 | 2-4 | 20-32 |

| 341-11-1 (.080" × .140") | | | |
|---|---|---|---|
| | Layer 1 | Layer 2 | Layer 3 |
| Material | KynarFlex 2500-00 | Elastollan C85A10 | Tygon F-4040-A |
| Extruder Size | 1.25" | 1.25" | 2.5" |
| Temp. Range (° F.) | 490-510 | 420-440 | 310-330 |
| Screw RPM | 4-9 | 2-4 | 15-28 |

| ID | Inner Diameter | Test Fuel | Chamber Temperature | Test Duration |
|---|---|---|---|---|
| Sample 341-11-1 - #1 | 1.8 mm | CARB Phase II | 40.0° C. | 42-days |
| Sample 341-11-1 - #2 | 1.8 mm | CARB Phase II | 40.0° C. | 42-days |
| Sample 341-11-1 - #3 | 1.8 mm | CARB Phase II | 40.0° C. | 42-days |
| Sample 341-11-1 - #4 | 1.8 mm | CARB Phase II | 40.0° C. | 42-days |
| Sample 341-11-1 - #5 | 1.8 mm | CARB Phase II | 40.0° C. | 42-days |

* 5 replicates were tested

| ID | Inner Diameter | Test Fuel | g/m²-day | Status |
|---|---|---|---|---|
| Sample 341-11-1 - #1 | 1.8 mm | CARB Phase II | 15 | PASS |
| Sample 341-11-1 - #2 | 1.8 mm | CARB Phase II | 12 | PASS |
| Sample 341-11-1 - #3 | 1.8 mm | CARB Phase II | 13 | PASS |
| Sample 341-11-1 - #4 | 1.8 mm | CARB Phase II | 14 | PASS |
| Sample 341-11-1 - #5 | 1.8 mm | CARB Phase II | 15 | PASS |

| Soak Temperature | 40.0° C. | Test Temperature | 40.0° C. |
|---|---|---|---|
| Soak Duration | 42 days | Test Duration | 21 days |
| Fuel Type | CARB Phase II | Fuel Type | CARB Phase II |

| TYPICAL PHYSICAL PROPERTIES | | |
|---|---|---|
| Property | ASTM Method | Value or Rating |
| Durometer Hardness (Shore A), 15 s | D2240 | 69 |
| Tensile Strength, psi (MPa) (at break) | D412 | 2,400 (16.5) |
| Ultimate Elongation, % | D412 | 450 |
| Tensile Modulus @ 100% Elongation, psi (MPa) | D412 | 850 (5.8) |
| Specific Gravity | D792 | 1.29 |
| Operation Temperature Range ° F. (° C.) | — | −20 to 180 (−28 to 82) |
| Color | — | Yellow |

Unless otherwise noted, all test were conducted at room temperature (73° F.). Values shown were determined on 0.075" thick extruded strip or 0.075" thick molded ASTM plaques or molded ASTM durometer buttons.

| RELATIVE CHEMICAL RESISTANCE PROPERTIES* | | | | | | | | |
|---|---|---|---|---|---|---|---|---|
| Acids | | | Bases | | | | Ethanol | |
| conc. | med. | weak | conc. | med. | weak | Salts | <=10% | Ketones |
| E | E | E | E | E | E | E | E | U |
| Oils | Greases | Fuels | Aliphatic Hydrocarbons | Aromatic Hydrocarbons | Sunlight Aging | Oxygen | Ozone | |
| E | E | E | E | E | F | E | E | |

E = Excellent G = Good F = Fair U = Unsatisfactory
*All tests conducted at room temperatures.

| Product Characteristics: | | Fuel Permeation (total tube), g/m²/d |
|---|---|---|
| Opacity | Transparent | CA Phase II, 40° C. 14 |
| Flammability Rating UL94 | UL 94 V0 (liner)/ UL 94 HB (cover) | |
| Proposed 40 CFR 1060 EPA Regulations | Conforms | |
| 40 CFR 1051 Recreational Engines and Vehicles | Conforms | |
| CA SORE Chapter 15, Article 1 | Conforms | |

| Performance Properties: | | |
|---|---|---|
| Property SAE J1527 | Specification | Test Value |
| Hot Air Aging, 70 hr. @ 100° C., | | |
| Liner Tensile Reduction | <20% | -17.6 |
| Liner Elongation Reduction | <50% | 0.0 |
| Oil Resistance IRM 903, 70 hr. @ 100° C., | | |
| Liner Tensile Reduction | <40% | -7.5 |
| Liner Elongation Reduction | <40% | +2.3 |
| Liner Volume Change | Within -5% to +25% | +0.7 |
| Fuel CE10 Immersion, 48 hr. @ 23° C., | | |
| Liner Tensile Reduction | <60% | +3.8 |
| Liner Elongation Reduction | <60% | +5.4 |
| Liner Volume Change | 0 to 60% | +1 |

| 341-11-1 (¼" × ⁷⁄₁₆") | | | |
|---|---|---|---|
| | Layer 1 | Layer 2 | Layer 3 |
| Material | KynarFlex 2500-00 | Elastollan C85A10 | Tygon F-4040-A |
| Extruder Size | 1.25" | 1.25" | 2.5" |
| Temp. Range (° F.) | 490-510 | 420-440 | 310-330 |
| Screw RPM | 4-9 | 2-4 | 15-28 |

A general screening method was developed to test tubing. Tubing segments utilized were anywhere from 12 to 36 inches length. The specimen was filled with a test fuel such as CE10 or EEE. The ends of the tubing are sealed with metal plugs, with weight loss measurements taken over the course of 10-15 days at 40° C. Permeation rate was calculated based on the daily weight losses and inner surface area exposure to fuel. Experimental products were given consideration if the permeation rate was below 15 g/m²/day.

Thermoplastic multi-layered (3) tubing which are compliant with the requirements of the California Air Resources Board (CARB) for low permeation fuel tubing are provided above and below. This tubing utilizes PVDF as the functional barrier layer, which is adhered to a layer of polyester thermoplastic polyurethane (TPU) which, in turn, is adhered to an outer layer of PVC.

The fuel permeation test conducted was performed as specified by CARB and is SAE J1737.

SAE J1737 was performed as follows: Tests were run at 40° C. This is the minimum test temperature required by CARB. In general this test measures the losses of hydrocarbon fuels through the walls of a tubing/hose specimen that is enclosed in a sealed chamber. A controlled flow of dry nitrogen gas is swept over the specimen while in the chamber and then through a canister containing activated charcoal. The hydrocarbons are collected in this canister and measured by weight changes or analyzed by other means. The flow of fuel is controlled between 10-20 L/hr. depending on the size of the tubing. The test specimens are conditioned (fuel soak) for 1000 hours prior to testing at 40° C. The test is continued until steady state is reached.

Fuel CE10 was prepared by mixing ASTM reference Fuel C with 10% ethanol by volume.

Linear peel strength measurements were determined by ASTM D413.

Samples were 3-layer tubes, ABC type, where layer A was a PVDF noted above. Layer B was a TPU layer. Layer C was a PVC layer. Peel tests were run on separating the inner layer from the barrier layer. Tubing sizes are noted below. Cross head speed was 2 in/min.

| Exp. Tubing | Construction Type | Av. Peel Force, lbf | Tube Size (inches) | Permeation Rate, gms/m²/day |
|---|---|---|---|---|
| C-648-CE-D11 | Kynarflex 2500/Estane 58213/C-527-D11 | 9.8 | .315 × .545 | 2.2 (CE10 @ 72 F.) |
| C-677-CE-D11 | Kynarflex 2500/Elastollan C85A10/C-527-D11 | 11 | .315 × .545 | 2.2 (CE10 @ 72 F.) |
| 339-287-1 | Kynarflex 2500/Estane 58277/C-527-D11 | 11.1 | .315 × .545 | NA |
| 341-11-1 | Kynarflex 2500/Elastollan C85A10/F-4040-A | NA | .080 × .140 | 10.6 (CE10 @ 72 F.) |
| 341-11-1 | Kynarflex 2500/Elastollan C85A10/F-4040-A | NA | ¼ × ⁷⁄₁₆ | 7 (EEE @ 40 C.) |

Samples had an average of 1.8 mm ID with a range of 1.7 mm to 1.9 mm to include allowable tolerances.

Although the present invention has been described with reference to preferred embodiments, persons skilled in the art will recognize that changes may be made in form and detail without departing from the spirit and scope of the invention. All references cited throughout the specification, including those in the background, are incorporated herein in their entirety. Those skilled in the art will recognize, or be able to ascertain, using no more than routine experimentation, many equivalents to specific embodiments of the invention described specifically herein. Such equivalents are intended to be encompassed in the scope of the following claims.

What is claimed is:

1. A flexible multi-layer tubular article for transport of a volatile hydrocarbon comprising: (a) an inner layer of a polyvinylidene difluoride copolymer comprising trifluoroethylene or hexafluoropropylene; (b) an intermediate thermoplastic polyurethane (TPU) layer covering the inner PVDF or polyvinylidene difluoride copolymer layer; and (c) a polyvinyl chloride polymer layer, wherein the polyvinyl chloride polymer layer covers the outside surface of the intermediate TPU layer, wherein the polyvinyl chloride polymer optionally contains a stabilizer or a plasticizer or mixtures thereof.

2. The flexible multi-layer tubular article according to claim 1 wherein the TPU is a polyester polyurethane.

3. The flexible multi-layer tubular article according to claim 1, wherein the optional stabilizer is an organo tin or Ba—Zn composition.

4. The flexible multi-layer tubular article according to claim 1, wherein the optional plasticizer is a polyol diester.

5. The flexible multi-layer tubular article according to claim 1, wherein the article has a maximum permeation rating of 15 g/m$^2$/day.

6. The flexible multi-layer tubular article according to claim 1, where in the article has a maximum permeation rating of 7 g/m$^2$/day.

7. The flexible multi-layer tubular article according to claim 1, where in the article has a maximum permeation rating of 5 g/m$^2$/day.

8. The flexible multi-layer tubular article according to claim 1, wherein the article has a maximum permeation rating of 15 g/m$^2$/day when the optional stabilizer, plasticizer or mixtures thereof is present.

9. The flexible multi-layer tubular article according to claim 1, where in the article has a maximum permeation rating of 7 g/m$^2$/day when the optional stabilizer, plasticizer or mixtures thereof is present.

10. The flexible multi-layer tubular article according to claim 1, where in the article has a maximum permeation rating of 5 g/m$^2$/day when the optional stabilizer, plasticizer or mixtures thereof is present.

11. A multi-layer tubular article consisting of: (a) an inner layer of a polyvinylidene difluoride polymer (PVDF) or a polyvinylidene difluoride copolymer; (b) an intermediate thermoplastic polyurethane (TPU) layer covering the inner PVDF or polyvinylidene difluoride copolymer layer; and (c) a polyvinyl chloride polymer layer, wherein the polyvinyl chloride polymer layer covers the outside surface of the intermediate TPU layer, wherein the polyvinyl chloride polymer optionally contains a stabilizer or a plasticizer or mixtures thereof.

12. The article according to claim 11, wherein the TPU is a polyester polyurethane.

13. The article according to claim 11, wherein the optional stabilizer is an organo tin or Ba—Zn composition.

14. The article according to claim 11, wherein the optional plasticizer is a polyol diester.

15. The article according to claim 11, wherein the article has a maximum permeation rating of 15 g/m$^2$/day.

16. The article according to claim 11, where in the article has a maximum permeation rating of 7 g/m$^2$/day.

17. The article according to claim 11, where in the article has a maximum permeation rating of 5 g/m$^2$/day.

18. The article according to claim 11, wherein the article has a maximum permeation rating of 15 g/m$^2$/day when the optional stabilizer, plasticizer or mixtures thereof is present.

19. The article according to claim 11, where in the article has a maximum permeation rating of 7 g/m$^2$/day when the optional stabilizer, plasticizer or mixtures thereof is present.

20. The article according to claim 11, where in the article has a maximum permeation rating of 5 g/m$^2$/day when the optional stabilizer, plasticizer or mixtures thereof is present.

* * * * *